June 3, 1930.  K. CAMP  1,762,047

PHOTOMETER

Filed March 17, 1928

WITNESSES
Edw. Thorpe
S.W. Foster

INVENTOR
Kingsland Camp
BY
ATTORNEY

Patented June 3, 1930

1,762,047

UNITED STATES PATENT OFFICE

KINGSLAND CAMP, OF NEWARK, NEW JERSEY

PHOTOMETER

Application filed March 17, 1928. Serial No. 262,348.

This invention relates to photometers, an object of the invention being to provide a manually operated device which will measure light and which is primarily adapted for use in connection with the art of photography and may constitute a separate apparatus or an attachment for a camera, enabling the user to insure a proper exposure and consequently the camera shutter manipulation.

Broadly speaking the invention includes a light of known brilliancy reflecting upon a ground glass, and a movable member controlling the exposure of said ground glass to the brilliance of the light to be measured so that when the light to be measured is equal to the brilliancy of the known light the position of the movable device indicates the strength of the brilliancy of the light to be measured.

My invention therefore includes the broad idea broadly expressed and may structurally take many different forms but I have shown in the accompanying drawings and shall hereinafter describe one form of apparatus which will function for the purpose.

The invention also includes certain novel details of construction and combinations and arrangements of parts, all of which will be more fully hereinafter described and pointed out in the claims.

Figure 1:
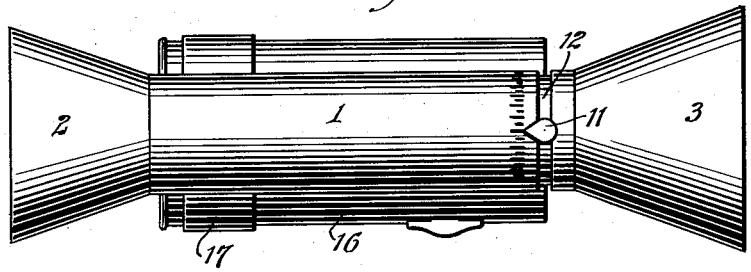
Figure 1 is a top plan view of an apparatus or device embodying my invention.
Figure 2:
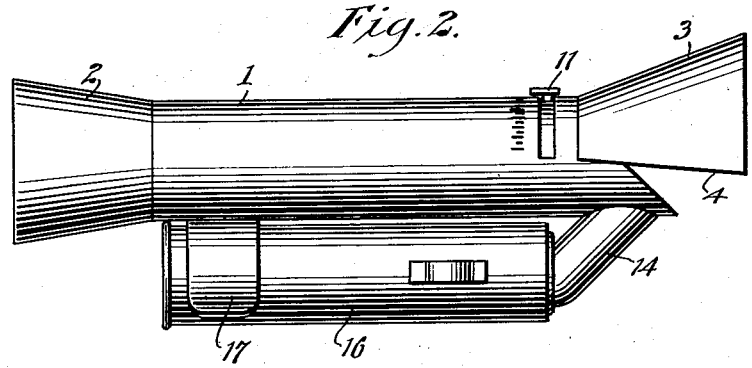
Figure 2 is a view in side elevation of Figure 1.

1 represents a casing, which is preferably cylindrical in form and of the desired length, which may have at one end a flared, somewhat elliptical sight tube 2. The opposite end of the casing 1 is provided with a flared bell mouth 3 which constitutes approximately one-half of a truncated cone, the lower wall 4 of which is flat and is located in alinement with a straight partition 5 in the casing.

The partition 5 divides the casing into upper and lower light chambers 6 and 7, respectively, and a disk 8 of ground glass is secured in the casing 1 at the inner end of the partition 5. A second disk 9 of ground glass is located adjacent the forward end of the casing, and the partition 5 extends at both sides of the disk 9.

In front of the disk 9 and spaced therefrom is a third disk 10 which is half transparent and half opaque, the opaque portion preferably having a black or other colored surface. The disk 10 has a radially projecting lug 11 thereon which constitutes a pointer registering with a scale on the outer face of the casing, and said lug or pointer movable in a slot 12 in casing 1.

Figure 3:
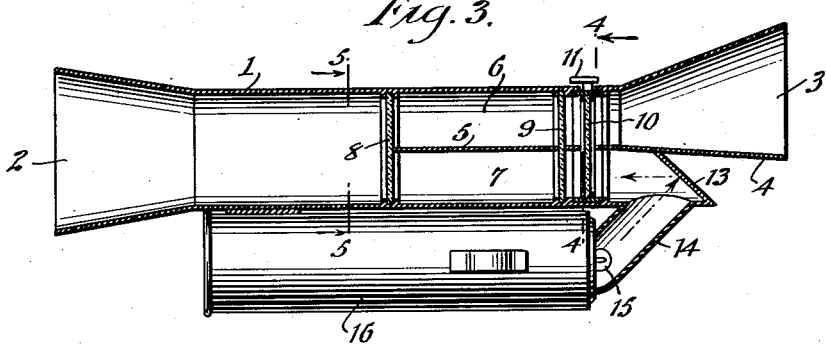
Figure 3 is a view in longitudinal section through the device.
Figure 4:
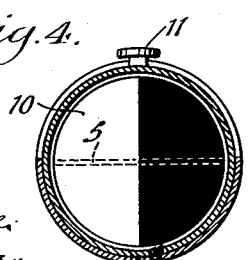
Figure 4 is an enlarged view in transverse section on the line 4—4 of Figure 3.
Figure 5:
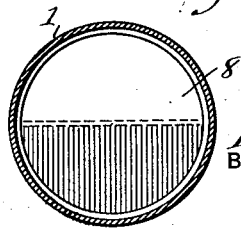
Figure 5 is an enlarged view in transverse section on the line 5—5 of Figure 3.

The lower forward portion of the casing 1 below the bell mouth 3 has an inclined end 13 forming a deflecting inner surface at right angles to a tube 14 communicating with an opening in the bottom of the casing so that light from an electric bulb 15 supported on a battery 16 can be positioned in said tube 14. The light therefrom will be deflected by the end 13, as indicated by the arrows in Figure 3.

A battery 16 is preferably held against the bottom of the casing 1 by means of a spring clamp 17 so that the battery may be removed or replaced as occasion may require.

The operation of the device is as follows:

The rays of light from the electric bulb 15 are directed longitudinally in the casing as above described to illuminate the lower portion of the disk 8, and, if the disk 8 is in a position so that its clear portion is in line with the upper portion of the disk 8, there will be a great discrepancy or difference in the brilliancy of the illumination between the upper and lower portions of the disk 8 when the operator looks through the casing at the natural light or illumination of the area in which the object to be photographed happens to be. By turning the disk 10 the opaque portion of said disk 10 will gradually shut off the light through the upper portion of the casing above the partition 5 so as to gradually dim the brilliancy of the light on the upper half of the disk 8, and when both halves of the disk 8 are illuminated alike then the operator can tell by the position of the pointer 11 the exact brilliancy or measurement of light.

The disk 9 back of disk 10 is employed to diffuse the light at the outside of its course through the tube channels or chambers above and below the partition 5, as I find that the employment of such a disk gives better results than if omitted.

I have described a specific apparatus which is capable of carrying out my invention, which consists broadly of a means employing a light of known brilliance, the rays of which are directed against a portion of ground glass, the other portion of ground glass being exposed to the light to be measured, together with a disk or other device which will gradually reduce the area of the light passage to the ground glass so that by the movement of this device to a position where the brilliancy of both portions of the ground glass is the same the brilliancy of the light to be measured is accurately indicated.

I therefore do not wish to be limited to the specific apparatus above described but desire to cover the idea broadly as expressed, and hence various changes and alterations might be made in the general form of the parts described without departing from my invention and I consider myself at liberty to make such changes and alterations as fairly fall within the spirit and scope of the appended claims.

I claim:

1. A photometer, including a casing constituting a sight tube, a ground glass extending across the casing, a turning disk at the forward end of the casing half clear and half opaque, a longitudinal partition in the casing between the ground glass and said disk, dividing the casing into two halves, a bell mouth constituting one-half of the forward end of the casing, a deflecting wall constituting the other half of the forward end of the casing, a tube communicating with the lower portion of the casing adjacent said deflecting wall, and means for holding a battery against the casing with the bulb thereof in the tube, and means connected with the last mentioned disk permitting the turning thereof to cut off the light to be measured from said ground glass.

2. A photometer, including a casing constituting a sight tube, a ground glass extending across the casing, a turning disk at the forward end of the casing half clear and half opaque, a longitudinal partition in the casing between the ground glass and said disk dividing the casing into two halves, a bell mouth constituting one-half of the forward end of the casing, a deflecting wall constituting the other half of the forward end of the casing, a tube communicating with the lower portion of the casing adjacent said deflecting wall, means for holding a battery against the casing with the bulb thereof in the tube, means connected with the disk permitting the turning thereof to cut off the light to be measured from said ground glass, and a diffusing disk located between the first-mentioned ground glass and the movable disk.

3. As a new article of manufacture, a direct vision comparison photometer, including an artificial light, a disk of ground glass or analogous material through portions of which both the artificial and natural lights are directed; a deflecting surface illuminated by said light and a disk having partially rotary mounting and having a clear part and an opaque part, said disk located in the path of both the natural and artificial light rays, said disk adapted to be turned to cut off the direct vision and the natural light whereby uniformity of natural and artificial light can be had.

4. As a new article of manufacture, a direct vision comparison photometer, including an artificial light, a disk of ground glass or analogous material through portions of which both the artificial and natural lights are directed; a deflecting surface illuminated by said light, and a disk having partially rotary mounting and having a clear part and an opaque part, said disk located in the path of both the natural and artificial light rays, said disk adapted to be turned to cut off the direct vision and the natural light whereby uniformity of natural and artificial light can be had within the photometer, said disk having an opaque sector thereon for cutting off the natural light.

5. As a new article of manufacture, a direct vision comparison photometer, including an artificial light, a disk having partial rotary mounting and having a clear part and an opaque part, said disk located in the path of both the natural and artificial light rays, said disk adapted to be turned to cut off the direct vision and the natural light whereby uniformity of natural and artificial light can be had, and a disk of ground glass or analogous material through portions of which the artificial light and the natural light are independently or separately directed for comparison.

6. As a new article of manufacture, a direct vision comparison photometer, including an artificial light, a surface illuminated by said light, a disk having partially rotary mounting adapted to be turned to cut off the direct vision and the natural light whereby uniformity of natural and artificial light can be had within the photometer, said disk having an opaque sector thereon for cutting off the natural light, and a disk of ground glass or analogous material through portions of which the artificial light and the natural light are independently or separately directed for comparison.

Signed at New York in the county of New York and State of New York this 16th day of March, 1928.

KINGSLAND CAMP.